(12) United States Patent
Sodagar (10) Patent No.: US 11,388,067 B2
(45) Date of Patent: Jul. 12, 2022

(54) SYSTEMS AND METHODS FOR NETWORK-BASED MEDIA PROCESSING (NBMP) FOR DESCRIBING CAPABILITIES

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/085,122

(22) Filed: Oct. 30, 2020

(65) Prior Publication Data

US 2021/0306229 A1    Sep. 30, 2021

Related U.S. Application Data

(60) Provisional application No. 63/006,199, filed on Apr. 7, 2020, provisional application No. 63/001,958, filed on Mar. 30, 2020.

(51) Int. Cl.
*H04L 41/50*   (2022.01)
*H04L 41/00*   (2022.01)
*H04L 65/65*   (2022.01)

(52) U.S. Cl.
CPC ............. *H04L 41/50* (2013.01); *H04L 41/20* (2013.01); *H04L 41/24* (2013.01); *H04L 65/608* (2013.01)

(58) Field of Classification Search
CPC ......... H04L 41/20; H04L 41/24; H04L 41/50; H04L 65/608
USPC ........................................................ 709/223
See application file for complete search history.

(56) References Cited

U.S. PATENT DOCUMENTS

| | | | |
|---|---|---|---|
| 2013/0006869 A1* | 1/2013 | Grab | G06F 21/10 705/51 |
| 2017/0317894 A1* | 11/2017 | Dao | H04L 41/5009 |
| 2019/0028552 A1* | 1/2019 | Johnson, II | H04L 67/02 |
| 2019/0200047 A1* | 6/2019 | Cui | H04N 21/4438 |
| 2020/0177694 A1* | 6/2020 | Kolan | H04L 67/34 |
| 2021/0105338 A1* | 4/2021 | Oyman | H04L 67/322 |
| 2021/0352113 A1* | 11/2021 | Sodagar | H04L 67/16 |

FOREIGN PATENT DOCUMENTS

WO   WO-2020188140 A1 *   9/2020  ........... G06F 9/5038

OTHER PUBLICATIONS

"3rd Generation Partnership Project; Technical Specification Group Services and System Aspects; Uplink Streaming (Release 16)", 3GPP TS 26.238, Mar. 2020, pp. 1-47, V16.4.2.

* cited by examiner

*Primary Examiner* — James E Springer
(74) *Attorney, Agent, or Firm* — Sughrue Mion, PLLC (57) ABSTRACT

Systems and methods for media processing and streaming is provided, a method is performed by at least one processor that implements a workflow manager of a media system. The method includes obtaining a description that includes at least one descriptor that indicates capabilities of an entity of the media system, the entity being a media processing entity, a media source, or a media sink, and the entity including at least one processor; determining the capabilities of the entity based on the at least one descriptor; and managing a media processing workflow based on the determining.

18 Claims, 7 Drawing Sheets

| Name | Definition | Unit | Type | Valid range |
|---|---|---|---|---|
| vcpu | number of vcpus to be reserved for the execution of Task | count | number | unsigned integer |
| vgpu | number of vgpus to be reserved for the execution of Task | count | number | unsigned integer |
| ram | memory to be reserved for the execution of Task | megabytes | number | unsigned integer |
| disk | size of local disk to be used by Workflow or Task | gigabytes | number | unsigned integer |
| placement | identifier of the geographical location of the data center in which the Task is to be executed. The location is represented by a two-letter (alpha-2) country code (ISO 3166-1) optionally followed by '-' and the postal code conforming to the country's postal code standard | identifier | string | N/A |
| location | identifier of the location of the source or sink. The identifier string should be unique in the operational network (e.g. IP address for internet, or unique identifier in a wireless operator network) | identifier | string | N/A |
| vcpu-availability | percentage of vcpu which is currently available | percent | number | 0-100 |
| vgpu-availability | percentage of vgpu which is currently available | percent | number | 0-100 |
| ram-availability | percentage of ram which is currently available | percent | number | 0-100 |
| disk-availability | percentage of storage which is currently available | percent | number | 0-100 |
| power-availability | percentage of battery which is currently available.<br><br>If the device is connected to power, this value is 100. | percent | number | 0-100 |

FIG. 7

SYSTEMS AND METHODS FOR NETWORK-BASED MEDIA PROCESSING (NBMP) FOR DESCRIBING CAPABILITIES

CROSS-REFERENCE TO RELATED APPLICATION

This application claims priority from U.S. Provisional Application No. 63/001,958, filed on Mar. 30, 2020, and U.S. Provisional Application No. 63/006,199, filed on Apr. 7, 2020, the disclosures of which are incorporated herein by reference in their entirety.

FIELD

Embodiments of this disclosure are directed to media processing and streaming methods and systems, more particularly to Moving Picture Experts Group (MPEG) Network-Based Media Processing (NBMP) and Framework for Live Uplink Streaming (FLUS) methods and systems.

BACKGROUND

Network and cloud platforms are used to run various applications. However, there is no standard based solution to describe the characteristics of a network or cloud platform or its elements, or the characteristics of a media source or sink device/platform in terms of computational and storage resources.

In one case, 3rd Generation Partnership Project (3GPP) FLUS protocol provides a mechanism for uplink streaming of multimedia content from a source device to a network and sending/distributing that content to one or more destinations. For example, the source device of media streams may establish an uplink session with a sink through a network, and FLUS APIs allow the source device to control the session and also the sink to provide feedback or remote control of the source device. The current 3GPP FLUS protocol supports retrieving the capabilities of the sink by the FLUS source. However, the capabilities are documented as a list of vendor-specific Uniform Resource Names (URNs), and if the FLUS source does not recognize the URN, it cannot know the corresponding capabilities. Accordingly, interoperability at the cross-vendor level is not achieved. The current 3GPP FLUS protocol is therefore only vendor specific, and does not provide any detailed description for achieving interoperability.

SUMMARY

Embodiments of the present disclosure may solve the above problems and/or other problems.

Embodiments of the present disclosure may implement the NBMP standard and describe the capabilities (e.g. characteristics) of a network and/or cloud platform, elements thereof, and/or a media source or sink device/platform. Embodiments of the present disclosure may achieve interoperability at the cross-vendor level.

Embodiments of the disclosure may define a description format to describe network or cloud resource capabilities, and/or the computational, storage and power resources in the media resource and media sink device/platform. This description format can be used by cloud platforms or network elements such as within 3rd Generation Partnership Project (3GPP) Framework for Live Uplink Streaming (FLUS) to describe their processing and functional capabilities. This description can be used by an NBMP workflow manager to run at least a part of a workflow in a media source, media sink, and/or a media processing entity.

According to one or more embodiments, a method performed by at least one processor that implements a workflow manager of a media system is provided. The method includes: obtaining a description that includes at least one descriptor that indicates capabilities of an entity of the media system, the entity being a media processing entity, a media source, or a media sink, and the entity including at least one processor; determining the capabilities of the entity based on the at least one descriptor; and managing a media processing workflow based on the determining.

According to an embodiment, the at least one descriptor includes a first descriptor that indicates at least one function repository supported by the entity, and the determining comprises determining the capabilities of the entity by retrieving, based on the first descriptor, a list of functions that are supported by the entity from the at least one function repository.

According to an embodiment, the at least one descriptor further includes a second descriptor that includes parameters that describe hardware or software capabilities of the entity.

According to an embodiment, the at least one descriptor includes a first descriptor that describes functions that are supported by the entity.

According to an embodiment, the at least one descriptor further includes a second descriptor that includes parameters that describe hardware or software capabilities of the entity.

According to an embodiment, the description is obtained by obtaining a JavaScript Object Notation (JSON) object, that includes the description, via a representational state transfer (REST) application programming interface (API).

According to an embodiment, the at least one processor implements a Network Based Media Processing (NBMP) workflow manager of an NBMP system, that includes the entity, and the media processing workflow that is managed by the at least one processor is an NBMP workflow.

According to an embodiment, the entity of the NBMP system is the media processing entity.

According to an embodiment, the entity of the NBMP system is the media source or the media sink.

According to an embodiment, the at least one processor implements a Framework for Live Uplink Streaming (FLUS) source of a FLUS system, that includes a FLUS sink as the entity.

According to one or more embodiments, a workflow manager of a media system is provided. The workflow manager includes: at least one processor; and memory comprising computer code, the computer code comprising: obtaining code configured to cause the at least one processor to obtain a description that includes at least one descriptor that indicates capabilities of an entity of the media system, the entity being a media processing entity, a media source, or a media sink, and the entity including at least one processor; determining code configured to cause the at least one processor to determine the capabilities of the entity based on the at least one descriptor; and managing code configured to cause the at least one processor to manage a media processing workflow of the media system based on the capabilities determined.

According to an embodiment, the at least one descriptor includes a first descriptor that indicates at least one function repository supported by the entity, and the determining code is configured to cause the at least one processor to determine the capabilities of the entity by retrieving, based on the first descriptor, a list of functions that are supported by the entity from the at least one function repository.

According to an embodiment, the at least one descriptor further includes a second descriptor that includes parameters that describe hardware or software capabilities of the entity.

According to an embodiment, the at least one descriptor includes a first descriptor that describes functions that are supported by the entity.

According to an embodiment, the at least one descriptor further includes a second descriptor that includes parameters that describe hardware or software capabilities of the entity.

According to an embodiment, the obtaining code is configured to cause the at least one processor to obtain the description by obtaining a JavaScript Object Notation (JSON) object, that includes the description, via a representational state transfer (REST) application programming interface (API).

According to an embodiment, the at least one processor implements a Network Based Media Processing (NBMP) workflow manager of an NBMP system, that includes the entity, and the media processing workflow that is managed by the at least one processor is an NBMP workflow.

According to an embodiment, the entity of the NBMP system is the media processing entity.

According to an embodiment, the entity of the NBMP system is the media source or the media sink.

According to one or more embodiments, a non-transitory computer-readable medium storing computer code is provided. The computer code is configured to, when executed by at least one processor that implements a workflow manager of a media system, cause the at least one processor to: obtain a description that includes at least one descriptor that indicates capabilities of an entity of the media system, the entity being a media processing entity, a media source, or a media sink, and the entity including at least one processor; determine the capabilities of the entity based on the at least one descriptor; and manage a media processing workflow of the media system based on the capabilities determined.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
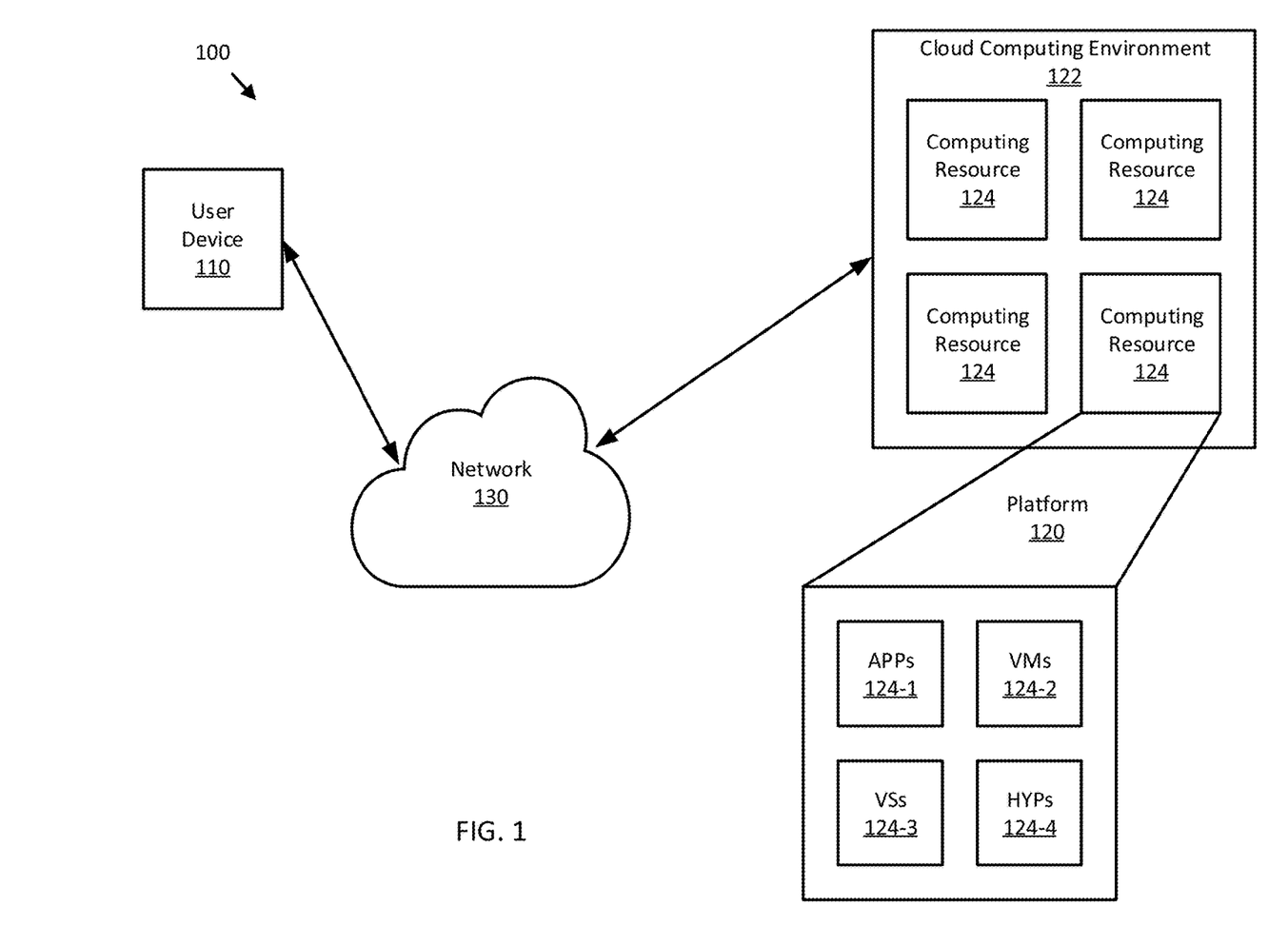
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
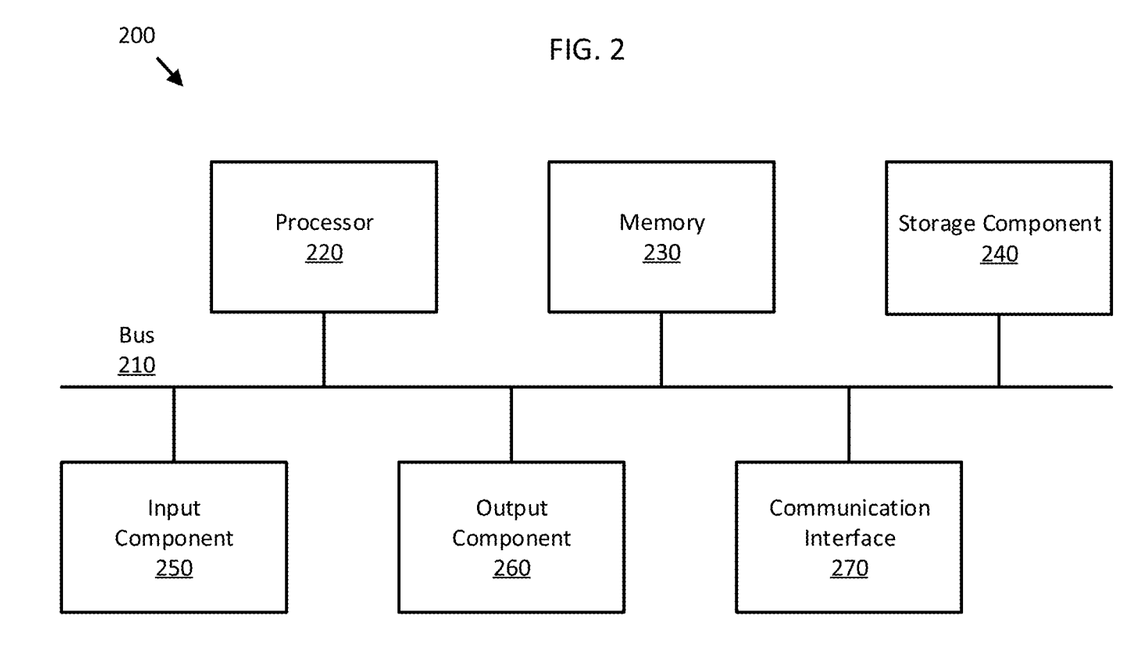
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
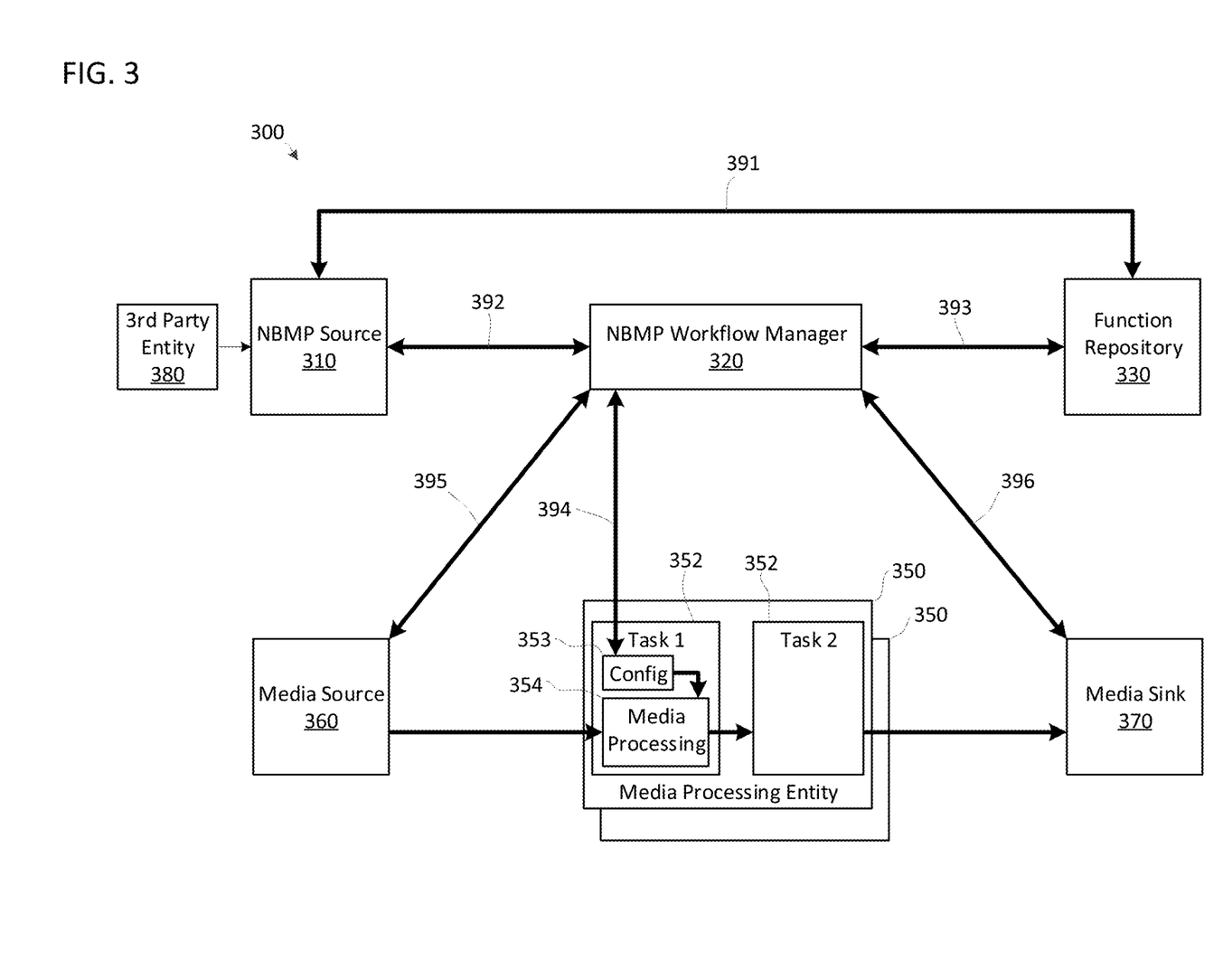
FIG. 3 is a block diagram of an NBMP system, according to embodiments.

In an embodiment of the present disclosure, an NBMP system 300 is provided. With reference to FIG. 3, the NBMP system 300 comprises an NBMP source 310, an NBMP workflow manager 320, a function repository 330, one or more media processing entities 350, a media source 360, and a media sink 370.

The NBMP source 310 may receive instructions from a third party entity 380, may communicate with the NBMP workflow manager 320 via an NBMP workflow API 392, and may communicate with the function repository 330 via a function discovery API 391. For example, the NBMP source 310 may send a workflow description document(s) (WDD) to the NBMP workflow manager 320, and may read the function description of functions stored in the function repository 330, the functions being media processing functions stored in memory of the function repository 330 such as, for example, functions of media decoding, feature point extraction, camera parameter extraction, projection method, seam information extraction, blending, post-processing, and encoding. The NBMP source 310 may comprise or be implemented by at least one processor and memory that stores code configured to cause the at least processor to perform the functions of the NBMP source 310.

The NBMP source 310 may request the NBMP workflow manager 320 to create workflow including tasks 352 to be performed by the one or more media processing entities 350 by sending the workflow description document, which may include several descriptors, each of which may have several parameters.

For example, the NBMP source 310 may select functions stored in the function repository 330 and send the workflow description document to the NBMP workflow manager 320 that includes a variety of descriptors for description details such as input and output data, required functions, and requirements for the workflow. The workflow description document may include a set of task descriptions and a connection map of inputs and outputs of tasks 352 to be performed by one or more of the media processing entities 350. When the NBMP workflow manager 320 receives such information from the NBMP source 310, the NBMP workflow manager 320 may create the workflow by instantiating the tasks based on function names and connecting the tasks in accordance with the connection map.

Alternatively or additionally, the NBMP source 310 may request the NBMP workflow manager 320 to create workflow by using a set of keywords. For example, NBMP source 310 may send the NBMP workflow manager 320 the workflow description document that may include a set of keywords that the NBMP workflow manager 320 may use to find appropriate functions stored in the function repository 330. When the NBMP workflow manager 320 receives such information from the NBMP source 310, the NBMP workflow manager 320 may create the workflow by searching for appropriate functions using the keywords that may be specified in a Processing Descriptor of the workflow description document, and use the other descriptors in the workflow description document to provision tasks and connect them to create the workflow.

The NBMP workflow manager 320 may communicate with the function repository 330 via a function discovery API 393, which may be a same or different API from the function discovery API 391, and may communicate with one or more of the media processing entities 350 via an API 394 (e.g. an NBMP task API). The NBMP workflow manager 320 may comprise or be implemented by at least one processor and memory that stores code configured to cause the at least processor to perform the functions of the NBMP workflow manager 320.

The NBMP workflow manager 320 may use the API 394 to setup, configure, manage, and monitor one or more tasks 352 of a workflow that is performable by the one or more media processing entities 350. In an embodiment, the NBMP workflow manager 320 may use the API 394 to update and destroy the tasks 352. In order to configure, manage, and monitor tasks 352 of the workflow, the NBMP workflow manager 320 may send messages, such as requests, to one or more of the media processing entities 350, wherein each message may have several descriptors, each of which have several parameters. The tasks 352 may each include media processing functions 354 and configurations 353 for the media processing functions 354.

In an embodiment, after receiving a workflow description document from the NBMP source 310 that does not include a list of the tasks (e.g. includes a list of keywords instead of a list of tasks), the NBMP workflow manager 320 may select the tasks based on the descriptions of the tasks in the workflow description document to search the function repository 330, via the function discovery API 393, to find the appropriate functions to run as tasks 352 for a current workflow. For example, the NBMP workflow manager 320 may select the tasks based on keywords provided in the workflow description document. After the appropriate functions are identified by using the keywords or the set of task descriptions that is provided by the NBMP source 310, the NBMP workflow manager 320 may configure the selected tasks in the workflow by using the API 394. For example, the NBMP workflow manager 320 may extract configuration data from information received from the NBMP source, and configure the tasks 352 based on the configuration data.

The one or more media processing entities 350 may be configured to receive media content from the media source 360, process the media content in accordance with the workflow, that includes tasks 352, created by the NBMP workflow manager 320, and output the processed media content to the media sink 370. The one or more media processing entities 350 may each comprise or be implemented by at least one processor and memory that stores code configured to cause the at least processor to perform the functions of the media processing entities 350. According to embodiments, the media processing entities 350 may be, for example, a cloud node, a computation resource, data center, one or more servers, etc.

The media source 360 may include memory that stores media and may be integrated with or separate from the NBMP source 310. In an embodiment, the NBMP workflow manager 320 may notify the NBMP source 310 when a workflow is prepared and the media source 360 may transmit media content to the one or more of the media processing entities 350 based on the notification that the workflow is prepared. According to embodiments, the media source 360 may be, for example, a user device or a server.

The media sink 370 may comprise or be implemented by at least one processor and at least one display that is configured to display the media that is processed by the one or more media processing entities 350. According to embodiments, the media sink 370 may be, for example, a user device.

The third party entity 380 may comprise or be implemented by at least one processor and memory that stores code configured to cause the at least processor to perform the functions of the third party entity 380.

As discussed above, messages from the NBMP Source 310 (e.g. a workflow description document for requesting creation of a workflow) to the NBMP workflow manager 320, and messages (e.g. for causing the workflow to be performed) from the NBMP workflow manager 320 to the one or more media processing entities 350 may include several descriptors, each of which may have several parameters. In cases, communication between any of the components of the NBMP system 300 using an API may include several descriptors, each of which may have several parameters.

Embodiments of the present disclosure may include a new NBMP Description Document(s) for defining a network cloud platform capability or for defining a source/sink device/platform capability. Embodiments of the present disclosure may use the constructs of the NBMP standard (ISO/IEC 23090-8), but also may include a new description(s). The new description(s) may provide a list of supported repositories, hardware resources, and characteristics of a device or platform.

[Capabilities Description of a Media Processing Entity]

The NBMP standard defines 3 different descriptions: Workflow, Function, and Task. Embodiments of the present disclosure may provide a new description for describing the network/cloud capabilities of one or more of the media processing entities 350, wherein the description may be called a Capabilities Description (CD). The CD may be defined as shown below in TABLE 1.

TABLE 1

| Capabilities Description (CD) | | |
|---|---|---|
| Descriptor | Additional constraints | Cardinality |
| Scheme | None | 0-1 |
| General | Following parameters may not be present: rank published-time priority execution-time input-ports output-ports is-group state | 1 |
| Repository | None | 0-1 |
| Functions | Array of Function Description. | 0-1 |
| Requirements | This descriptor may be used to describe the network/cloud capabilities: 1. "Flowcontrol" may define the range of capabilities 2. Hardware parameters may define the hardware capabilities 3. Security parameters may define the supported security features Following parameters may not be present: Workflow/Task requirement parameters Resource estimator parameters | 0-1 |
| Failover | Describes the failover support | 0-1 |

Cardinality:
1 = exactly one,
0-1 = zero or one

With reference to TABLE 1, the CD may include a plurality of descriptors including, for example, one or more of a Scheme Descriptor(s), a General Descriptor(s), a Repository Descriptor(s), a Function Descriptor(s), a Requirements Descriptor(s), and a Failover Descriptor(s).

[Capabilities Description of a Source/Sink]

Embodiments of the present disclosure may provide a new description for describing the source or sink device/platform capabilities (e.g. capabilities of one or more of the media source 360 and the media sink 370 illustrated in FIG. 3) wherein the description may be called a (Source or Sink) Capabilities Description (SD). The SD may be defined as shown below in TABLE 2.

TABLE 2

Source/Sink Capabilities Description (SD)

| Descriptor | Additional constraints | Cardinality |
| --- | --- | --- |
| Scheme | None | 0-1 |
| General | An "id" may be included and may be unique among all sources and sinks.<br>Following parameters may not be present:<br>rank<br>published-time<br>priority<br>execution-time<br>input-ports<br>output-ports<br>is-group<br>state | 1 |
| Repository | None.<br>The repositories may define the list of functions that are supported by the media sink/source device/platform. | 0-1 |
| Functions | Array of Function Description. | 0-1 |
| Requirements | This descriptor is used to describe the capabilities:<br>4. "Flowcontrol" may define the range of current capabilities<br>5. Hardware parameters may define the hardware capabilities<br>6. Security parameters may define the supported security features<br>Following parameters may not be present:<br>Workflow/Task requirement parameters<br>Resource estimator parameters | 0-1 |
| Events | This descriptor may list events for source or sink in the case of reduced resource availability such as low CPU, low GPU, low memory, low bandwidth, low disk, low power. | 0-1 |

Cardinality:
1 = exactly one,
0-1 = zero or one

With reference to TABLE 2, the SD may include a plurality of descriptors including, for example, one or more of a Scheme Descriptor(s), a General Descriptor(s), a Repository Descriptor(s), a Functions Descriptor(s), a Requirements Descriptor(s), and an Events Descriptor(s).

To signal the current availability of a media sink (e.g. media sink 370) or media source (e.g. media source 360) device/platform, since these resources may be dynamic and change with time, parameters may be included as hardware parameters in the SD to signal the percentage of the resources available to be utilized. According to embodiments, the hardware parameters may be included in the SD as a part of the "Requirements" descriptor. Tables 500 and 600, illustrated in FIGS. 5-6, show examples of such hardware parameters and their definitions.

Figure 5:
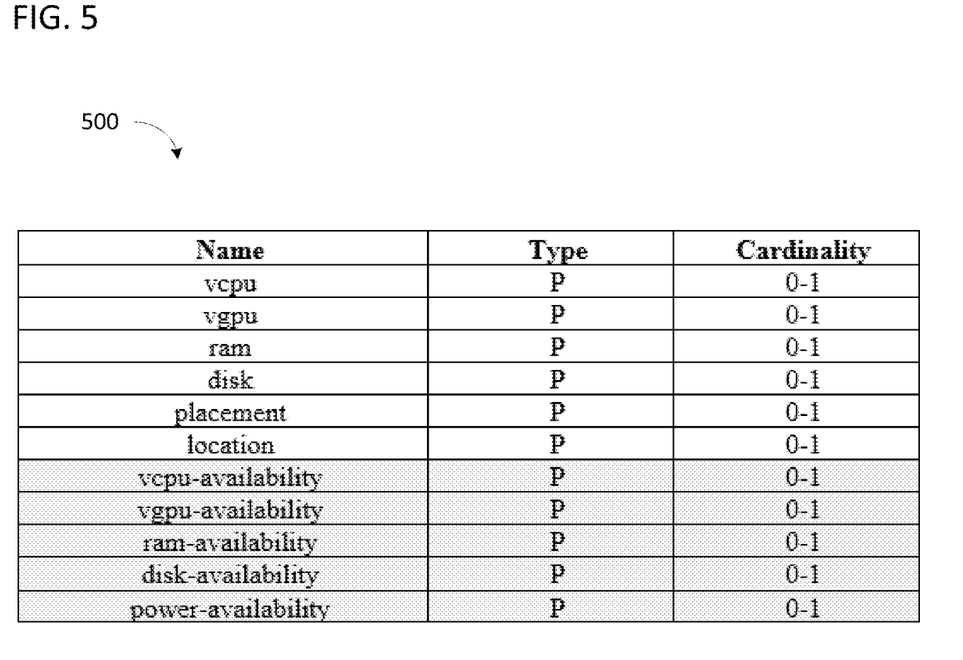
FIG. 5 is a first chart of parameters according to embodiments.
Figure 6:
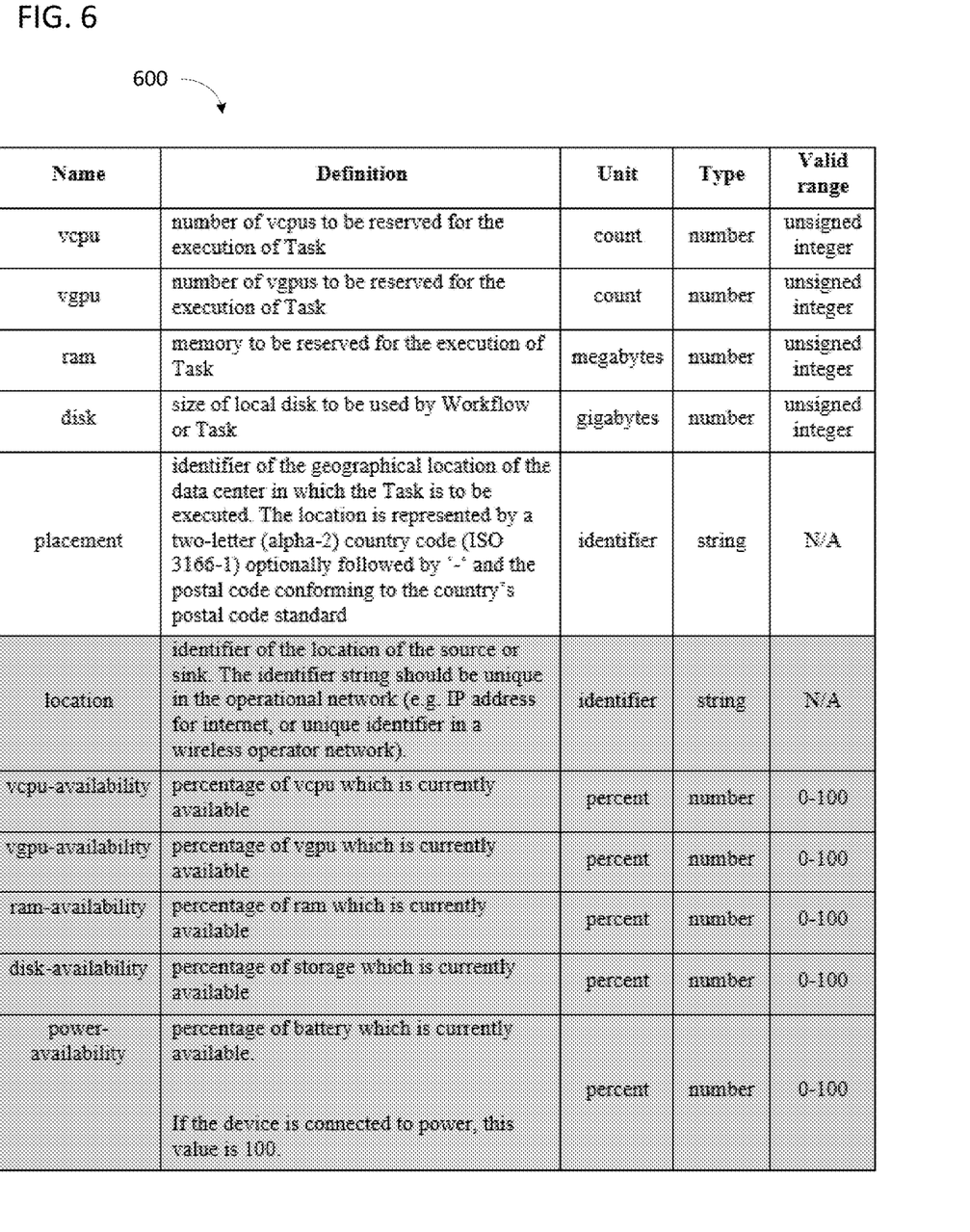
FIG. 6 is a second chart of parameters according to embodiments.

With reference to table 500 of FIG. 5 and table 600 of FIG. 6, parameters such as "vcpu", "v u", "ram", "disk", "placement", "location", "vcpu-availability", "vgpu-availability", "ram-availability", "disk-availability", and "power-availability" may be included. The parameter "vcpu" may indicate the number of virtual central processing units (vcpus) to be reserved for the execution of a Task. The parameter "vgpu" may indicate the number of virtual graphics processing units (vgpus) to be reserved for the execution of a Task. The parameter "ram" may indicate memory to be reserved for the execution of a Task. The parameter "disk" may indicate the size of a local disk to be used by a Workflow or Task. The parameter "placement" may be an identifier of the geographical location of a data center in which the Task is to be executed. The parameter "location" may be an identifier of the location of a source (e.g. media source 360) or a sink (e.g. media sink 370). The parameter "vcpu-availability" may indicate the percentage of vcpu of the source or sink which is currently available. The parameter "vgpu-availability" may indicate the percentage of vgpu of the source or sink which is currently available. The parameter "ram-availability" may indicate the percentage of ram of the source or sink which is currently available. The parameter "disk-availability" may indicate the percentage of storage of the source or sink which is currently available. The parameter "power-availability" may indicate the percentage of battery of the source or sink which is currently available. According to embodiments, a same descriptor can be used for describing capability of a cloud platform, a cloud node or sub-platform, or a network element or a subnetwork capability.

[Functional Capabilities]

With reference to TABLE 1 and FIG. 3, the Repository Descriptor of the Capabilities Description (CD or SD) may list the function repositories 330 that are supported by the entity that is described by the Capabilities Description. Each of the function repositories 330 that are supported may include a list of functions that are supported. Alternatively, the descriptions of the functions that are supported may be included in the Capabilities Description (CD or SD) as an array of Function Descriptions. For example, the array of Function Descriptions may be included in a Functions Descriptor of the Capabilities Description.

According to the above, the list of supported functions, and their characteristics, of one or more media processing entities 350 (or a media source 360 or media sink 370) can be retrieved by obtaining a Capabilities Description. These characteristics may include, for example:

1. Supported input formats, codecs, and codec profiles/levels, resolutions, frame rates
2. Transcoding with formats, output codecs, codec profiles/levels, bitrates, and others
3. Reformatting with output format,
4. Combination of input media streams, e.g. network-based stitching, mixing,
5. Recognition or synthesis of media Description Documents and Resources Embodiments of the present disclosure may also include the following entities:

1. Capabilities Description Document (CDD), which may be a document that contains a Capabilities Description (CD) of a media processing entity as a JavaScript Object Notation (JSON) object.
2. Capabilities Resource (CR), which may be a representational state transfer (REST) resource that contains the CDD. For example, according to embodiments, the CR may be one of the media processing entities 350 (refer to FIG. 3).
3. Source/Sink Capabilities Description Document (SDD), which may be a document that contains a Capabilities Description (SD) of a media source or a media sink as a JSON object.
4. Source/Sink Resource (SR), which may be a REST resource that contains the SDD. For example, according to embodiments, the SR may be the media source 360 or the media sink 370 (refer to FIG. 3).

[Examples of Use in 3GPP FLUS]

The CDs, CDDs, CRs, SDs, SDDs, and SRs of embodiments of the present disclosure may be implemented in a 3GPP FLUS architecture.

Figure 4:
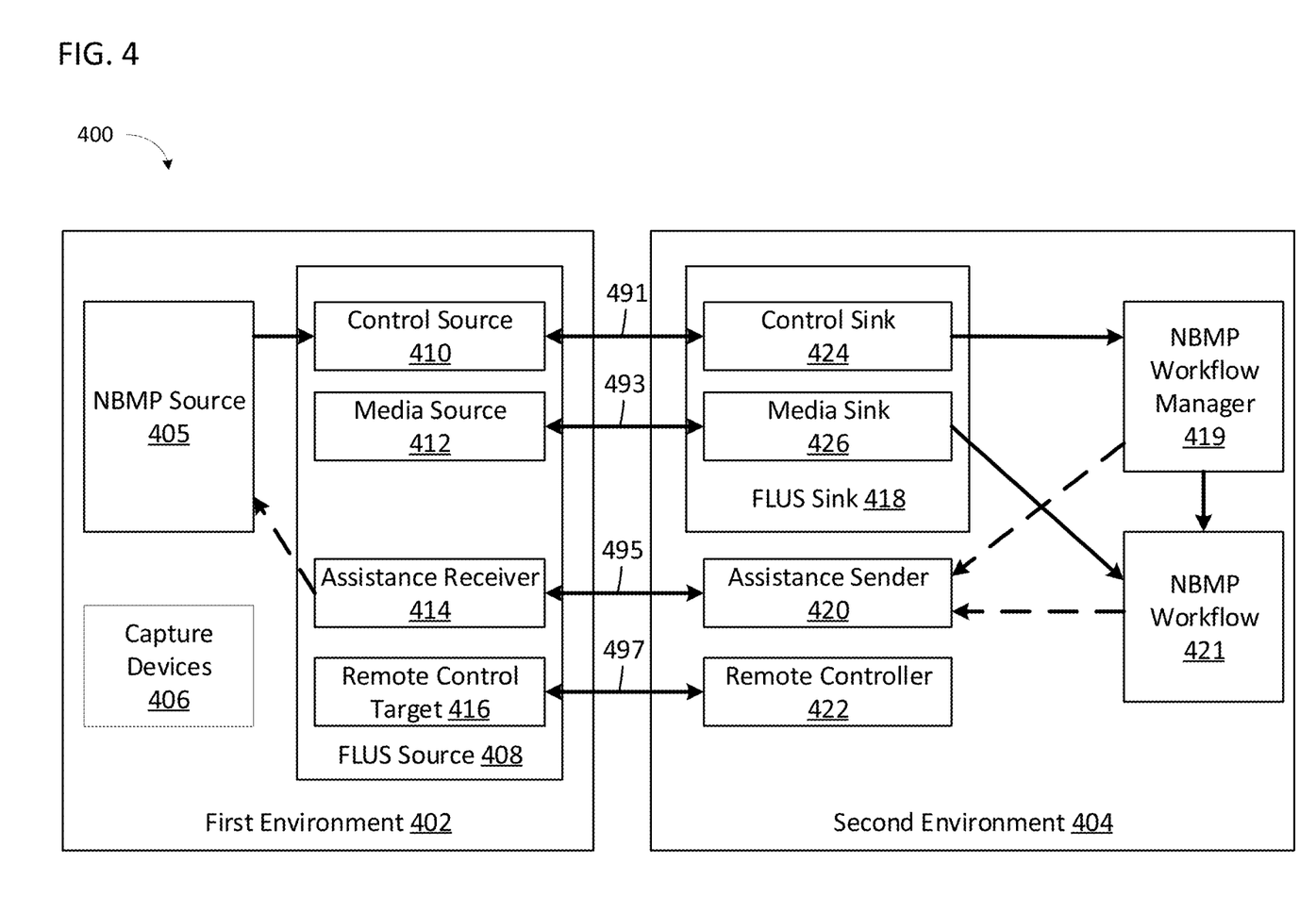
FIG. 4 is a block diagram of a 3GPP FLUS architecture, according to embodiments.

Referring now to FIG. 4, a block diagram of a 3GPP FLUS architecture 400 of an embodiment of the present disclosure is depicted. The 3GPP FLUS architecture 400 may comprise a first environment 402 (e.g. a user environment that comprises or consists of one or more user devices) and a second environment 404 (e.g a user environment or a network). The first environment 402 may comprise an NBMP source 405 (which may correspond to NBMP source 310), one or more capture devices 406, and a FLUS source 408. The FLUS source 408 may comprise a control source 410, a media source 412, an assistance receiver 414, and a remote control target 416. The second environment 404 may comprise a FLUS sink 418, an NBMP workflow manager 419 (which may correspond to NBMP workflow manager 320), an assistance sender 420, an NBMP workflow 421 (which may include, for example, tasks 352 that may be performable by at least one processor, with memory, in the second environment 4040 or another environment), and a remote controller 422. The FLUS sink 418 may comprise a control sink 424 and a media sink 426.

Any number of the NBMP source 405, capture devices 406, control source 410, media source 412, assistance receiver 414, and remote control target 416 may be implemented by a same or different at least one processor and memory, storing computer instructions, of the first environment 402. Also, any number of the control sink 424, media sink 426, assistance sender 420, remote controller 422, and NBMP workflow manager 419 may be implemented by a same or different at least one processor and memory, storing computer instructions, of the second environment 404.

Communication between the first environment 402 and the second environment 404 may be provided by, for example, a network. For example, the communication may be provided via a link 491 (e.g. an F-C link), a link 493 (e.g. an F-U link), a link 495 (e.g. an F-A link), a link 497 (e.g. an F-RC) link. The link 491 may represent end points of a communication route between the control source 410 and the control sink 424. The link 493 may represent end points of a communication route between the media source 412 and the media sink 426. The link 495 may represent end points of a communication route between the assistance receiver 414 and the assistance sender 420. The link 497 may represent end points of a communication route between the remote control target 416 and the remote controller 422.

The FLUS source 408 may receive media content from one or more of the capture devices 406 within the first environment 402, or connected to the first environment, and forward the media content to the media sink 426. The media sink 426 may forward the media content to a decoding and rendering function and/or to a processing or distribution sub-function within the second environment 404.

The control source 410 may control, via link 491, the control sink 424 to process received media content for subsequent downstream distribution, and may select FLUS media instantiation. The link 491 may represent interactions associated with the creation and modification of the configuration of the FLUS sink 418. For example, the link 491 may allow the control source 410 to select a FLUS media instantiation, provide static metadata associated with each media session present in the FLUS session, and select and configure the processing and distribution sub-functions.

The media source 412 and the media sink 426 may, using the link 493, set up one or more media sessions and subsequent media data transmissions via media streams. FLUS media instantiation may be defined as part of a FLUS session. Multiple media streams may be established for one FLUS session. A media stream may contain media components of one or more media content types (e.g. audio and/or video). A FLUS session may be composed of one or more media streams containing, for example, the same content type (e.g. multiple media streams of video).

The assistance sender 420 may send, via the link 495, assistance messages to the assistance receiver 414. The FLUS source 408 may be configured to alter behavior of the FLUS media function (e.g. media sending behavior of the media source) within the FLUS source 408 based on the assistance messages. Assist information within assist messages may pertain to, for example, network related conditions, viewership or engagement information from content recipients, or user preference data. An example recommendation issued by the assistance receiver 414 to the media source 412 may be to only upload the first 5 seconds of video to the FLUS sink 418, due to current absence of viewership of live uplink streaming content.

The remote controller 422 may send, via the link 497, control messages to the remote control target 416. The control messages may include commands such as, for example, to start or stop a media upstreaming process in the FLUS source 408. The FLUS source 408 may be configured to alter behavior of the media source 412 based on the control messages. The remote controller 422 may, via the link 497, provide media sink information to the FLUS source 408, select a FLUS media instantiation, and determine capture device settings and other FLUS source parameters.

According to a 3GPP FLUS specification, a communication mechanism is only defined for a FLUS Session. Also, as part of updating a FLUS sink configuration, a WDD can be submitted. Finally, using a "get FLUS Sink Status" a WDD can be received.

According to embodiments, the NBMP Source 405 may define a workflow processing at the network or the destination device (e.g. the second environment 404). The NBMP workflow manager 419 and the NBMP workflow 421 may reside on the network or the destination device (e.g. the second environment 404).

According to embodiments of the present disclosure, capabilities of the FLUS Sink 418 may be as described in TABLE 3 below.

TABLE 3

Properties of Sink Resource

| Property Name | Description | Example Values |
|---|---|---|
| capabilities | List of supported features and instantiations by the FLUS sink. Each capability may be expressed using a URN. | urn:vnd:xzy:capability-name |

The FLUS source 408 can retrieve the resource description of a sink resource (e.g. FLUS sink 418) and find out its capabilities based on the entries of TABLE 1. However, since the list may consist of vendor-specific URNs, only the recognized URNs by FLUS source 408 may be meaningful.

Embodiments of the present disclosure may thus use the CDD instead of the list of URNs. For example, the FLUS source 408 may retrieve the CDD. Since the CDD may provide the details of capabilities in a standard form, the FLUS source 408 can recognize and parse the CDD to obtain the capabilities of the FLUS sink 418.

[Examples of Use in NBMP]

According to embodiments, with reference to FIG. 3, a media processing entity 350 may maintain a CDD that includes Capabilities Description (CD) of the media processing entity 350, and send the CDD to the NBMP workflow manager 320 via API 394 (or another similar API) upon being requested to do so via the API 394 (or another similar API). Accordingly, the NBMP workflow manager 320 may obtain the capabilities of the media processing entity 350 and manage (e.g. create) a workflow based on the capabilities obtained. For example, the NBMP workflow manager 320 may divide a workflow between a plurality of media processing entities 350 for processing media, based on the capabilities of the plurality of media processing entities 350 obtained using a respective CDD from each of the plurality of media processing entities 350.

According to embodiments, with reference to FIG. 3, a media source 360 (or a media sink 370) may maintain an SDD that includes Capabilities Description (SD) of the media source 360 (or the media sink 370), and send the SDD to the NBMP workflow manager 320 via API 395 (or API 396 in a case the SDD is maintained by the media sink 370) upon being requested to do so via the API 395 (or the API 396). Accordingly, the NBMP workflow manager 320 may obtain the capabilities of the media source 360 (or the media sink 370) and manage (e.g. create) a workflow based on the capabilities obtained using the SDD. For example, the NBMP workflow manager 320 may allocate Tasks to the media source 360 (or the media sink 36), based on the capabilities of the media source 360 (or the media sink 36) obtained.

According to embodiments of the present disclosure, at least one processor with memory storing computer code may be provided. The computer code may be configured to, when executed by the at least one processor, perform any number of aspects of the present disclosure.

Figure 7:
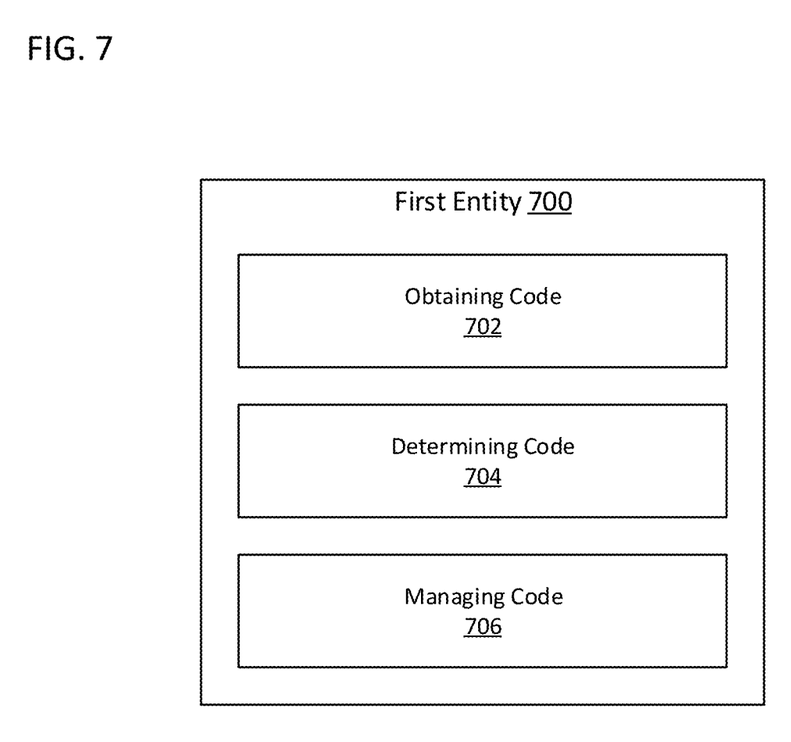
FIG. 7 is block diagram of computer code according to embodiments.

For example, with reference to FIG. 7, a first entity 700 of a media system may comprise the at least one processor and the memory storing the computer code. The compute code may comprise, for example, obtaining code 702, determining code 704, and managing code 706.

The obtaining code 702 may cause the at least one processor of the first entity 700 to obtain a CDD or SDD that includes a Capabilities Description (CD or SD) of a second entity of the media system. For example, the at least one processor of the first entity 700 may query the second entity of the media system for capabilities of the second entity, and the second entity may respond by sending the CDD or SDD to the first entity. According to embodiments, the Capabilities Description may be a JSON object and the query may be performed via a representational state transfer (REST) API. Examples of such an API may include, for example, API 394, API 395, or API 396 in FIG. 3.

The determining code 704 may cause the at least one processor of the first entity 700 to determine the capabilities of the second entity based on the Capabilities Description in the CDD or SDD obtained. For example, the at least one processor of the first entity 700 may recognize and parse the CDD or SDD to obtain information (e.g. parameters) to determine the capabilities of the second entity and/or, in a case where function repositories (e.g. function repositories 330 of FIG. 3) are listed in the Capabilities Description, the at least one processor of the first entity 700 may query the corresponding function repositories, based on the listed function repositories, to obtain a list of functions supported by the second entity to determine the capabilities.

The managing code 706 may cause the at least one processor of the first entity 700 to manage a workflow for media processing based on the determinations of the determining code 704. For example, the at least one processor may determine the workflow based on the capabilities, including how the workflow is to be divided between the second entity and other entities.

According to embodiments, with reference to FIGS. 3-4, the first entity 700 may be, for example, the NBMP workflow manager 320 or the FLUS source 408. According to embodiments, the second entity may be, for example, the media source 360, a media processing entity 350, the media sink 370, or the FLUS sink 418. According to embodiments, the media system described with reference to FIG. 7 may be, for example, an NBMP system, a FLUS system, a combination thereof, or any other media system.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method performed by at least one processor that implements a workflow manager of a media system, the method comprising:
    obtaining a description that includes at least one descriptor that indicates capabilities of an entity of the media system, the entity being a media processing entity, a media source, or a media sink, and the entity including at least one processor;
    determining the capabilities of the entity based on the at least one descriptor; and
    managing a Network Based Media Processing (NBMP) workflow based on the determining,
    wherein the at least one descriptor includes a first descriptor that indicates at least one function repository supported by the entity,
    the determining comprises determining the capabilities of the entity by retrieving, based on the first descriptor, a list of functions that are supported by the entity from the at least one function repository, and
    the at least one function repository is remote from the entity.

2. The method of claim 1, wherein
the at least one descriptor further includes a second descriptor that includes parameters that describe hardware or software capabilities of the entity.

3. The method of claim 1, wherein
the at least one descriptor includes another descriptor that describes functions that are supported by the entity.

4. The method of claim 3, wherein
the at least one descriptor further includes a second descriptor that includes parameters that describe hardware or software capabilities of the entity.

5. The method of claim 1, wherein
the description is obtained by obtaining a JavaScript Object Notation (JSON) object, that includes the description, via a representational state transfer (REST) application programming interface (API).

6. The method of claim 1, wherein
the at least one processor implements a NBMP workflow manager of an NBMP system, that includes the entity.

7. The method of claim 6, wherein
the entity of the NBMP system is the media processing entity.

8. The method of claim 6, wherein
the entity of the NBMP system is the media source or the media sink.

9. The method of claim 1, wherein
the at least one processor implements a Framework for Live Uplink Streaming (FLUS) source of a FLUS system, that includes a FLUS sink as the entity.

10. A workflow manager of a media system, the workflow manager comprising:
    at least one processor; and
    memory comprising computer code, the computer code comprising:
        obtaining code configured to cause the at least one processor to obtain a description that includes at least one descriptor that indicates capabilities of an entity of the media system, the entity being a media processing entity, a media source, or a media sink, and the entity including at least one processor;
        determining code configured to cause the at least one processor to determine the capabilities of the entity based on the at least one descriptor; and
        managing code configured to cause the at least one processor to manage a Network Based Media Processing (NBMP) workflow of the media system based on the capabilities determined,
    wherein the at least one descriptor includes a first descriptor that indicates at least one function repository supported by the entity,
    the determining code is configured to cause the at least one processor to determine the capabilities of the entity by retrieving, based on the first descriptor, a list of functions that are supported by the entity from the at least one function repository, and the at least one function repository is remote from the entity.

11. The workflow manager of claim 10, wherein the at least one descriptor further includes a second descriptor that includes parameters that describe hardware or software capabilities of the entity.

12. The workflow manager of claim 1, wherein the at least one descriptor includes another descriptor that describes functions that are supported by the entity.

13. The workflow manager of claim 12, wherein the at least one descriptor further includes a second descriptor that includes parameters that describe hardware or software capabilities of the entity.

14. The workflow manager of claim 10, wherein the obtaining code is configured to cause the at least one processor to obtain the description by obtaining a JavaScript Object Notation (JSON) object, that includes the description, via a representational state transfer (REST) application programming interface (API).

15. The workflow manager of claim 10, wherein the at least one processor implements a NBMP workflow manager of an NBMP system, that includes the entity.

16. The workflow manager of claim 15, wherein the entity of the NBMP system is the media processing entity.

17. The workflow manager of claim 15, wherein the entity of the NBMP system is the media source or the media sink.

18. A non-transitory computer-readable medium storing computer code that is configured to, when executed by at least one processor that implements workflow manager of a media system, cause the at least one processor to:
   obtain a description that includes at least one descriptor that indicates capabilities of an entity of the media system, the entity being a media processing entity, a media source, or a media sink, and the entity including at least one processor;
   determine the capabilities of the entity based on the at least one descriptor; and
   manage a Network Based Media Processing (NBMP) workflow of the media system based on the capabilities determined,
   wherein the at least one descriptor includes a first descriptor that indicates at least one function repository supported by the entity, and
   the computer code is configured to cause the at least one processor to determine the capabilities of the entity by retrieving, based on the first descriptor, a list of functions that are supported by the entity from the at least one function repository, and
   the at least one function repository is remote from the entity.

* * * * *